INVENTOR.
Erich M. Krzyzanowski &
Heinz Schweikert
By Ronald E. Barry
Attorney

United States Patent Office 3,339,620
Patented Sept. 5, 1967

3,339,620
CAVITYLESS CASTING PATTERN AND
METHOD OF MAKING SAME
Erich M. Krzyzanowski, Ludwigshafen (Rhine), and Heinz
Schweikert, Ludwigshafen-Rheingonheim, Germany, assignors to Full Mold Process, Inc., Milwaukee, Wis., a corporation of Delaware
Filed Dec. 21, 1964, Ser. No. 419,757
8 Claims. (Cl. 164—24)

ABSTRACT OF THE DISCLOSURE

An expendable cellular plastic pattern for casting metals which has the gaps and voids in its outer surface filled with a low melting point wax to provide a smooth outer surface for the pattern.

---

This invention relates to expanded plastic patterns that can be used in cavityless casting processes and to a method for making such patterns and more particularly to patterns of the type which are gasifiable at the temperature of the molten casting charge without any applicable residue.

Since the introduction of the cavityless casting process to the foundry industry as set forth in Shroyer Patent No. 2,830,343, there has been a rapid adoption of the process with a resulting realization of some of the problems incident to its use. Chief among these was the problem encountered in using the expanded plastic material without any surface finish. The casting produced had a surface finish which conformed to the finish on the pattern and was, as a consequence, fairly rough. This problem was considered minor when considered in relation to the advantages in using these patterns.

Expanded plastic patterns have the advantage of being structurally strong, are not easily deformed and are readily formed into a variety of complex shapes which can be cast in a single operation. The patterns are also easily fabricated into clusters by the expediency of using cements as solvents. In the preparation of patterns of substantial dimension, the pattern can be fabricated in separate sections of plastics which can be joined together to form a composite pattern of adequate strength to withstand the pressures exerted against the pattern during the formation of the forming material in the mold.

The expanded plastic pattern has the one major deficiency indicated above. Regardless of whether it is molded or cut to the final dimension, its outer surface is uneven due to the make up of the pattern material. As is well known, the patterns are made by expanding beads or granules within a mold or by forming sheets of expanded plastic material and cutting to the desired shape. Since the expanded beads of plastic material are nothing more than small bubbles, the outer surface or skin of the pattern when formed in a mold consists of many of these bubbles with small gaps located between the bubbles. Also when the pattern is cut to the final dimension, each of the bubbles on the surface is also cut, leaving voids on the surface of the pattern.

Attempts to overcome this problem have been directed toward coating the entire outer surface of the pattern with a waxy composition to produce a smooth surface. Since it is difficult to control the thickness of such coatings, the dimensional accuracy of the pattern is lost. Any attempt to provide an even coating is also difficult because of the variations in the combination and temperature of the composition and the form and position of the surface that has to be coated.

One of the primary objects of the present invention is to provide an expanded plastic pattern that has a smooth outer surface and accurate outer dimension.

Another object of the present invention is to provide a method for smoothing the outer surface of an expanded plastic pattern without affecting the surface dimensions of the pattern.

Another object of the present invention is to provide a discontinuous coating for an expanded plastic pattern that is gasifiable at the elevated temperature of the molten casting charge without any appreciable residue.

A further object of the present invention is to provide an expanded plastic pattern which can be used in a cavityless casting process which requires a substantially smaller amount of coating material on its outer surface to produce a smooth surface for castings.

A still further object of the present invention is to provide an expanded plastic pattern for cavityless casting processes having a substantially smooth outer surface that conforms exactly to the outer dimension of the article to be cast with said surface readily adhering to any ceramic or fireproof coatings that may be applied thereto.

In order to accomplish these results, it was first necessary to find a coating that could be applied to the pattern without any substantial effect on the surface of the pattern. At first a layer or coating of paraffin waxlike material was applied to the entire outer surface of the pattern. This provided the desired smooth outer surface but adversely affected the outer dimension of the pattern as well as its permeability to the gases produced on gasification of the pattern. It was further found that the addition of a ceramic or fireproof coating was difficult because the coating would not adhere to the paraffin wax base.

It was then decided to use a wax-like composition coating and apply it to the surface of the pattern so that it only filled the gaps or voids in the surface. A low melting wax-like composition was selected having a melting point substantially below the melting point of the pattern. A heatable spatula was used to spread the wax composition so that it flowed into and filled the gaps and voids on the surface of the pattern. Since the heat required to melt the composition is substantially below that required to melt the pattern, there is no effect on the pattern. The spatula can be wiped across the surface of the pattern so that substantially none of the composition is left on the surface of the pattern. A continuous surface is thereby formed which will not adversely affect the permeability of the surface of the pattern and leaves sufficient pattern material exposed for adherence to any ceramic coating that may be applied to the pattern.

Other objects and advantages will become more readily apparent from the following detailed description when read in connection with the accompanying drawings, in which.

It should be noted that any of a wide variety of thermoplastic, resinous materials of the tape capable of being expanded into cellular plastic patterns may be used in the practice of the invention. These include various polyolefins, such as polyethylene, polypropylene, copolymers of ethylene and propylene, and the like; vinyl aromatic resins such as expanded polystyrene, polyvinyltoluene, copolymers of styrene and vinyl toluene, and the like; and such halohydrocarbons as polyvinylchloride, copolymers of vinyl chloride and monomers such as vinyl acetate, vinylidene chloride, diethyl maleate, ethyl acrylate and the like. Other suitable types of resins include thermoplastic cellulose esters such as cellulose acetate, polyurethanes, acrylate, and acrylate copolymers, cellulose ethers such as ethyl cellulose and the like. The pattern material which has been most successfully used up to the present has been the polystyrene material with considerable effort now being directed toward the use of polyurethane.

Figure 1:
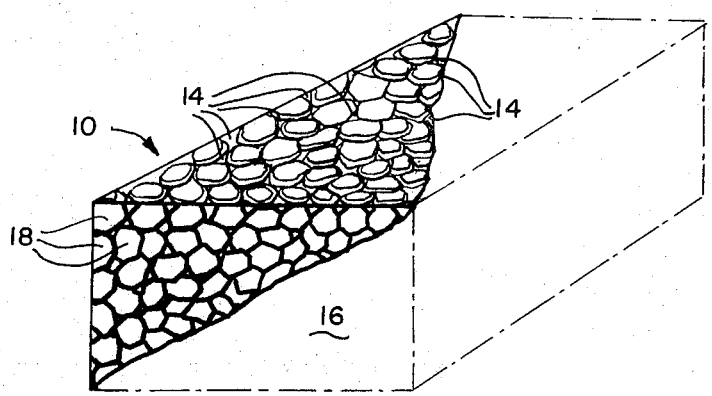
FIG. 1 is a view of a block of pattern material having the upper surface molded to a flat surface and the front surface cut to the desired shape.
Figure 2:
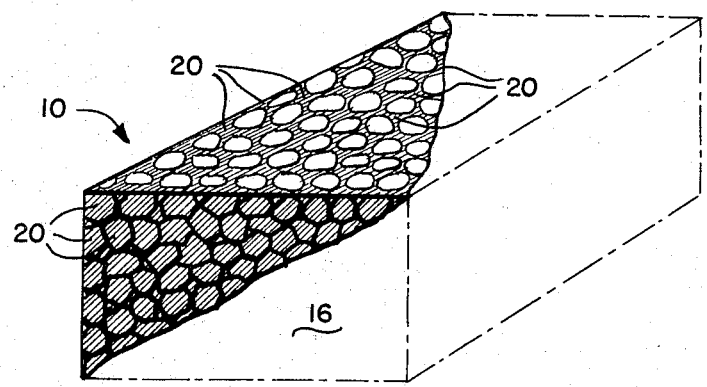
FIG. 2 is a view similar to FIG. 1 showing the top and front surfaces coated with the wax-like material.

In FIG. 1 of the drawing, a pattern 10 is shown which has a top surface 12 that has been formed in a mold during the expansion of the pattern material. The individual expanded granules or beads on this surface will be flat on top with small gaps 14 located between each of the expanded granules or beads.

The front surface 16 is formed by cutting the pattern material with a sharp instrument to the desired shape. Since the expanded granules or beads 18 are in the form of small bubbles, each bead on the front surface will be cut open, leaving fairly large voids on the surface. If the pattern is then embedded in the forming material for a mold, the gaps or voids will fill with the material, producing the undesired result. Unless these gaps and voids are filled, the surface of the casting will have to be finished to the depth of the deepest of these gaps or voids.

A lower melting point material is used to coat the pattern material and may be selected from such materials as low melting point paraffin waxes which are commonly derived from petroleum hydrocarbons and from natural waxes such as carnauba wax and beeswax and the like, and mixtures thereof. Also useful are such low melting point solids as hydrogenated vegetable oils and saturated fatty acids having sufficient molecular weight to be solid at ambient temperature. Thus, for example, hydrogenated high molecular weights fish oils, stearic acid and hydrogenerated beef tallow might be suitable as coatings on the surfaces of the base material to form a completed pattern. The melting point of this material should be within the range of 60° C. to 90° C. so that it is substantially below that of the pattern material.

The low melting point wax composition 18 is spread on either the top or front surface of the pattern by means of a heatable instrument such as a spatula. The wax will then flow into the gaps or voids, filling them completely with practically none of the wax being left on the surface of the pattern. The wax composition will form a continuous surface in conjunction with the expanded plastic material which forms the surface of the pattern.

Once the pattern material has been coated with the wax material, it is then often coated with a layer of solid material which remains solid and is gas permeable at the elevated temperature of the molten casting charge. These materials generally include diatomaceous earth or kieselguhr, asbestos, synthetic mineral fibers such as mineral wood, fire clay, clay, pumice, bentonite, perlite, vermiculite and the like, to which quartz sand or a similar material may be added if desired. Binding agents are also used with these mineral materials such as thermosetting or preferably cold setting substances such as plaster of Paris, cement, starch or synthetic resins. In spreading or dipping the pattern to apply the material to the surface of the pattern, it is important that it adhere to the surface of the pattern. If the wax composition is applied to the entire surface, the second coating will not adhere to it. When the composition is used to fill the gaps only, the remainder of the surface will be exposed for adherence to the second or solid layer.

In the practice of the present invention, a pattern material which is gasifiable substantially without residue on subjection to a molten casting charge is formed either by molding or cutting to the exact reproduction of an article to be cast. The gaps or voids in the surface of the pattern are then filled with a composition having a melting point substantially below that of the pattern material by applying the composition to the surface of the pattern with a heated instrument. When the composition cools, a layer of a solid material which remains solid and is gas permeable at the temperature of the molten casting charge is applied to the entire outer surface of the pattern. The coated pattern is then embedded in the mold forming material with appropriate passages for any feeder heads and risers required for casting the pattern. On pouring the molten casting charge into the mold, the heat of the casting charge will decompose the pattern with the molten charge filling the space left by the decomposed pattern. Since the outer surface of the pattern is cut to the exact dimensions of the article to be cast and has been smoothed to this exact dimension, the article will have a smooth outer surface of substantially the exact dimensions required for the article.

Although only a few embodiments of the present invention have been shown and described, it should be apparent that various changes and modifications can be made herein without departing from the scope of the appended claims.

What is claimed is:

1. A pattern suitable for use in a cavityless casting process which comprises
   a base made of expanded plastic granules which are gasifiable at the elevated temperature of a molten casting charge, said base having small gaps in its outer surfaces, and
   a wax-like composition placed only in said gaps on the surfaces of the pattern to provide in conjunction with the exposed pattern surface-defining surfaces of the granules a smooth outer surface on the pattern and substantially none of said composition being on said exposed surfaces.

2. For use in a cavityless casting process, a casting pattern of cellular plastic material having substantially the configuration of an article to be cast and being adapted to be gasified at the elevated temperature of the molten casting charge which is to be cast to form said article,
   said pattern being formed by the expansion of polystyrol beads which form an outer surface on the pattern having gaps located between the beads,
   said gaps being filled with a paraffin substance to form in conjunction with the exposed pattern surface-defining surfaces of the beads a smooth continuous outer surface.

3. A pattern according to claim 2 wherein said paraffin substance has a melting point substantially below the melting point of the pattern material.

4. For us in a casting arrangement, a casting pattern, comprising in combination,
   a gasifiable pattern made of expanded plastic granules having substantially the configuration of an article to be cast and being adapted to be gasified at the elevated temperature of the molten casting charge which is to be cast to form said article,
   said pattern having the gaps and voids on its outer surface only filled with a composition to provide in conjunction with the exposed pattern surface-defining surface of the granules a smooth continuous surface for said pattern which is substantially coextensive with the configuration of the article to be cast.

5. A pattern according to claim 4 wherein said composition comprises
   a paraffin wax having a melting point substantially below that of the gasifiable pattern.

6. A pattern according to claim 4 including a layer of solid material which remains solid and is gas permeable at the elevated temperature of the molten casting charge.

7. A method for making a pattern which is gasifiable substantially without residue on subjection to a molten casting charge, comprising the steps of
   expanding plurality of thermally expandable plastic granules to form a pattern having the exact form of the article to be cast, coating the surface of the thus formed pattern with a low melting point composition to fill the gap between the expanded granules, and wiping the surface of the pattern with a spatula which has been heated to the melting temperature of the wax to leave, the portion of the plastic granules on the surface of the pattern exposed.

8. The method according to claim 7 including the step of coating the surface of said pattern with a layer of solid material which remains solid and is gas permeable at the temperature of the molten casting charge, said coating adhering to the exposed portions of the plastic material.

References Cited

UNITED STATES PATENTS

| 2,830,343 | 4/1958 | Shroyer | 22—196 |
| 2,846,742 | 8/1958 | Wagner | 22—164 |
| 2,894,918 | 7/1959 | Killoran et al. | 260—2.5 |
| 2,908,602 | 10/1959 | Collardeau et al. | |
| 2,908,952 | 10/1959 | Benham | 22—193 |
| 3,063,113 | 11/1962 | Operhall et al. | 22—164 X |
| 3,189,242 | 6/1965 | Orr | 117—168 X |
| 3,314,116 | 4/1967 | Wittmoser et al. | 22—129 |

J. SPENCER OVERHOLSER, *Primary Examiner.*

V. K. RISING, *Assistant Examiner.*